(12) United States Patent
Klair

(10) Patent No.: US 10,030,378 B1
(45) Date of Patent: Jul. 24, 2018

(54) PORTABLE TOILET

(71) Applicant: Scott L. Klair, Rancho Mirage, CA (US)

(72) Inventor: Scott L. Klair, Rancho Mirage, CA (US)

( * ) Notice: Subject to any disclaimer, the term of this patent is extended or adjusted under 35 U.S.C. 154(b) by 0 days.

(21) Appl. No.: 14/979,001

(22) Filed: Dec. 22, 2015

(51) Int. Cl.
*A47K 11/00* (2006.01)
*E03D 11/10* (2006.01)
*A47K 11/02* (2006.01)

(52) U.S. Cl.
CPC ............ *E03D 11/10* (2013.01); *A47K 11/02* (2013.01)

(58) Field of Classification Search
CPC ........ A47K 11/00; A47K 11/02; A47K 11/04; A47K 11/06; E03D 11/10
USPC ...................................... 4/479, 483
See application file for complete search history.

(56) References Cited

U.S. PATENT DOCUMENTS

| 325,039 | A | * | 8/1885 | Beers | ............... A47K 11/04 220/200 |
| 506,905 | A | * | 10/1893 | Corwin | ............... A47K 11/04 4/234 |
| 3,484,875 | A | | 12/1969 | Eisenberg | |
| 3,747,130 | A | * | 7/1973 | Sargent | ............... E03D 5/012 4/321 |
| 3,801,991 | A | * | 4/1974 | Fulton | ............... E03D 5/01 4/321 |
| 4,216,553 | A | * | 8/1980 | Haberle | ............... E03D 9/005 4/223 |
| 4,261,380 | A | * | 4/1981 | Siegwart | ............... F16K 47/00 137/514 |
| 4,807,308 | A | | 2/1989 | Person et al. | |
| 5,170,516 | A | | 12/1992 | Davison | |
| 5,485,637 | A | | 1/1996 | Green | |
| 5,950,251 | A | | 9/1999 | Cost et al. | |
| 8,978,173 | B1 | * | 3/2015 | Lederer | ............... A47K 11/04 4/434 |
| 2008/0168597 | A1 | * | 7/2008 | Bartlett | ............... A47K 11/02 4/321 |

\* cited by examiner

*Primary Examiner* — J. Casimer Jacyna
(74) *Attorney, Agent, or Firm* — Brian C. Trask

(57) ABSTRACT

A portable toilet for use in restricted areas or subsequent to natural disaster. The toilet provides a temporary container for noxious products, such as human waste. One embodiment includes a bucket, a valve, and a removable fluid-tight lid. One or more legs space the bucket from the ground, and provide clearance for the valve. A toilet seat or other load bearing arrangement permits deposits into the container. The fluid-tight lid resists escape of noxious contents during transport of the toilet. The contents of a portable toilet may be discharged through the valve into a permanent toilet, RV dump station, or other suitable receptacle. Certain embodiments include provision for a closed-system, clean-in-place wash-down.

20 Claims, 4 Drawing Sheets

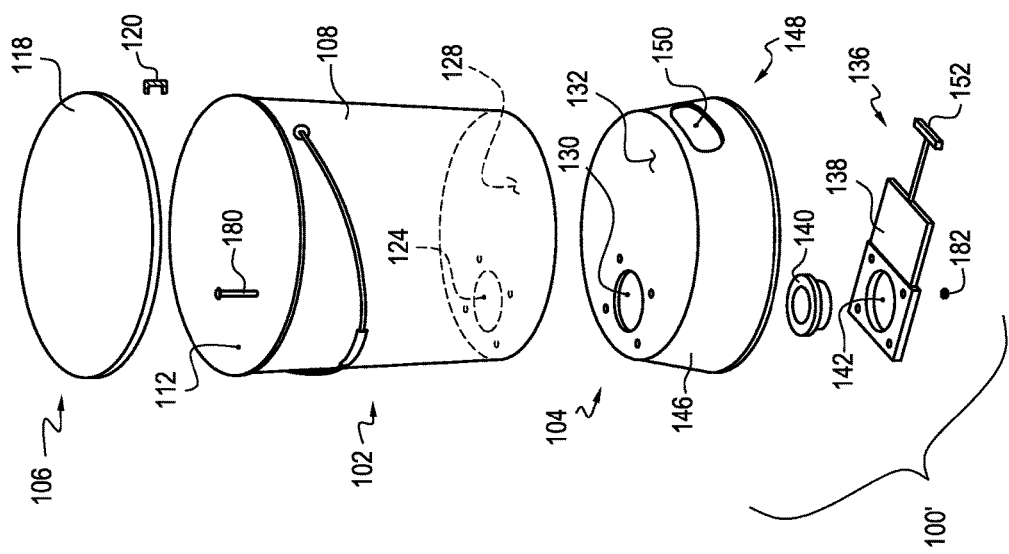
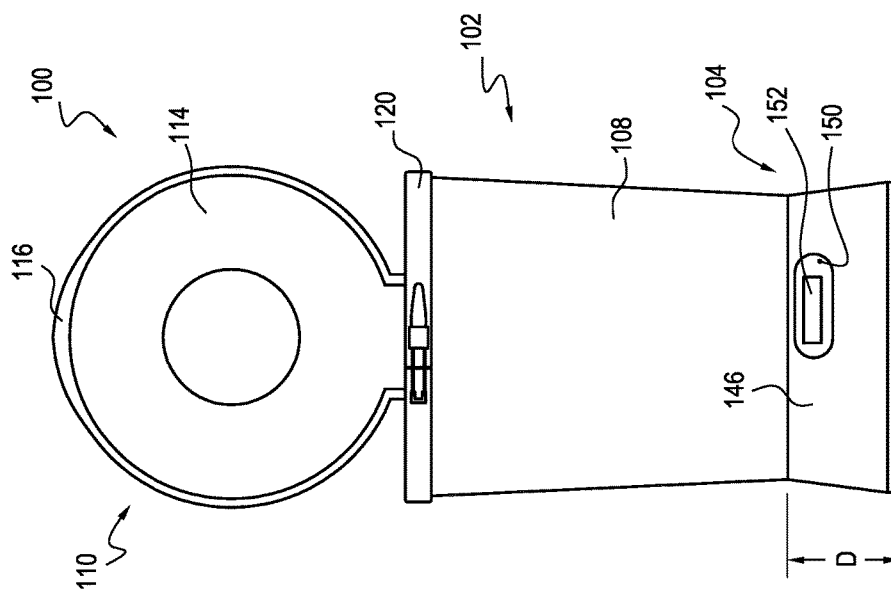

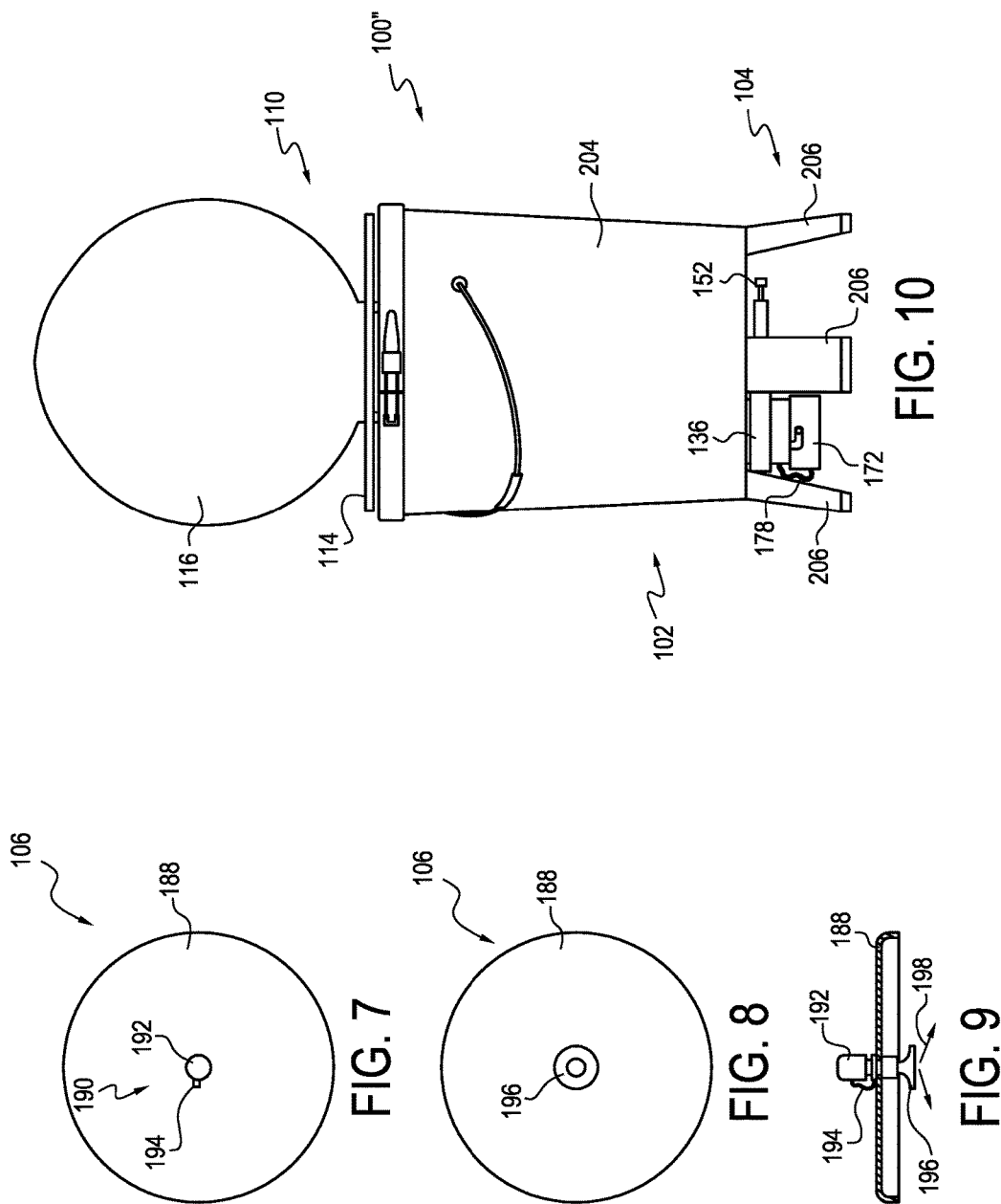

PORTABLE TOILET

BACKGROUND

Field of the Invention

This invention relates to devices that provide temporary storage for hazardous or noxious materials. It is particularly directed to a portable toilet for use in e.g. restricted areas or subsequent to a natural disaster.

State of the Art

Many inventors have worked to develop portable waste containment systems, including portable toilets. Representative U.S. patents include: U.S. Pat. Nos. 5,959,251; 5,485,637; 5,170,516; 4,807,308; and 3,484,875. Commercially available portable toilets include various models that are intended to be transported in an RV, boat, and the like. Portable versions of such devices (e.g. "Jon-ny Partner") are relatively heavy, and even empty, require two hands to transport, and are too cumbersome for convenient use in certain minimalistic camping or transportation situations.

One minimalistic-type portable toilet that is commercially available is called "Luggable Loo". Toilets of that sort use a bucket with a toilet seat that fits on the bucket. These simple type units require a liner like a trash bag because there is no easy way to clean out the bucket after use. The major problem is the disposal of the waste. These units by design eliminate the possibility for treating the waste appropriately. The liner and waste are typically deposited in the trash and then transported to a landfill.

BRIEF SUMMARY OF THE INVENTION

This invention provides a solution for temporary storage of noxious materials, and a way to transport such materials to an appropriate disposal site. A first embodiment includes a re-sealable container with a bottom, a first wall circumscribing the bottom to define a volume sized between about 1 cubic foot and about 3 cubic feet in which to temporarily store noxious materials, and an access opening associated with a top of the first wall. The first embodiment also includes a drain hole passing through the bottom, and a valve member operable to open and close the drain hole, as desired. One operable valve member is a guillotine valve. Typically, actuation structure of the valve member is disposed below the bottom and in a volume partially defined by the first distance.

The first embodiment also includes a lid structured to form a removable fluid-tight seal for the access opening. A currently preferred lid carries a spray nozzle with a fluid discharge opening disposed to introduce fluid to the inside of the container effective to flush debris therefrom. A toilet seat structured to couple in functional relation with container's access opening is also included in embodiments adapted to operate as a portable toilet, and can be a replacement or exchangeable part for a lid.

Sometimes, the first embodiment may include a discharge adapter structured as an enclosed conduit extension effective to convey debris from the drain hole toward a disposal receptacle. A first operable adapter is a flexible hose. A second operable adapter is a rigid conduit extension.

The first embodiment desirably includes a leg member operable to space its bottom above a support surface by a first distance. A currently preferred leg member includes a skirt. One such skirt includes a second wall structured to form an extension depending from a perimeter of the bottom. Generally, a top of the second wall is structured to engage substantially the entire perimeter of the bottom. In some cases, the second wall is flared such that a bottom of the second wall forms a perimeter support surface defining a larger area than encompassed by the bottom. That configuration improves stability of the container.

An aperture is desirably formed in the skirt, with the aperture being sized and arranged to permit manual operation of the valve member. Sometimes, the leg member is structured to provide storage for a discharge adapter. An operable discharge adapter is structured to form an enclosed conduit extension between the valve member and a receptacle for disposal of contents of the container. One workable leg member includes a skirt with a top formed in agreement with the container bottom, a flaring second wall depending from a perimeter of the top to form a perimeter support surface defining a larger area than encompassed by the bottom, structure of the top being trapped in compression between the bottom and structure associated with the valve member, and an aperture disposed in the second wall being sized and arranged to permit manual operation of the valve member.

The invention may be embodied as a portable toilet. Certain embodiments of a toilet include: a bucket; a leg member affixed to the bucket, the leg member being structured to support the bottom of the bucket such that the bottom of the bucket is spaced apart from a support surface by a working distance; a drain hole passing through the bottom of the bucket; a valve affixed to the bucket and operable to occlude the drain hole, actuation structure of the valve being disposed below the bottom of the bucket and in a volume partially defined by the working distance; a removable lid structured to form a fluid-tight seal for the top of the bucket; and a toilet seat structured to couple with the top of the bucket. In certain cases, the drain hole is off-set from the bucket centerline.

The leg member may include a skirt with a top formed in agreement with the bucket's bottom, a flaring second wall depending from a perimeter of the top to form a perimeter support surface defining a larger area than encompassed by the bucket's bottom, structure of the top being trapped in compression between the bucket's bottom and structure associated with the valve, and an aperture disposed in the second wall being sized and arranged to permit manual operation of the valve.

Sometimes, a removable lid carries a spray nozzle with a fluid discharge opening disposed to introduce fluid to the inside of the bucket effective to flush debris therefrom, the spray nozzle comprising seal structure effective to resist egress of noxious smells or fluid from confinement inside the bucket.

Another embodiment of a portable toilet includes: a bucket; a leg member affixed to the bucket, the leg member being structured to support the bottom of the bucket such that the bottom of the bucket is spaced apart from a support surface by a working distance, the working distance being between about 3 inches and about 12 inches; a drain hole passing through the bottom of the bucket, the drain hole being off-set from the bucket centerline; a guillotine valve affixed to the bucket and operable to occlude the drain hole, actuation structure of the valve at a closed position being disposed below the bottom of the bucket and in a working volume partially defined by the working distance, actuation structure of the guillotine valve being accessible by way of an access opening provided by the cooperatingly structured leg member; a removable lid structured to form a fluid-tight seal for the top of the bucket; and a toilet seat structured to couple with the top of the bucket.

BRIEF DESCRIPTION OF THE DRAWINGS

In the drawings, which illustrate what are currently considered to be the best modes for carrying out the invention:

FIG. 1 is a side view in elevation of a currently preferred embodiment structured according to certain principles of the invention;

FIG. 2 is an exploded assembly view in perspective of an embodiment similar to that illustrated in FIG. 1;

FIG. 7 is a top view of a workable lid;

FIG. 8 is a bottom view of the lid illustrated in FIG. 7;

FIG. 9 is an approximate cross-section mid-plane side view in elevation of the lid illustrated in FIG. 7; and FIG. 10 is a view in perspective of an alternative embodiment structured according to certain principles of the invention.

DETAILED DESCRIPTION OF THE ILLUSTRATED EMBODIMENTS

Figure 3:
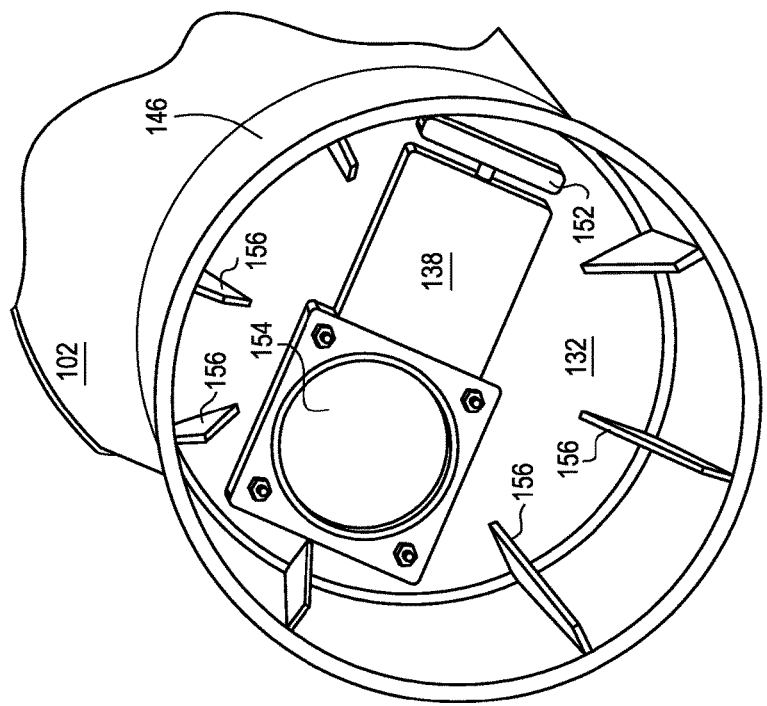
FIG. 3 is a bottom view in perspective of a portion of the embodiment illustrated in FIG. 1.

Reference will now be made to the drawings in which the various elements of the illustrated embodiments will be given numerical designations and in which the invention will be discussed so as to enable one skilled in the art to make and use the invention. It is to be understood that the following description is only exemplary of the principles of the present invention, and should not be viewed as narrowing the claims which follow.

A currently preferred embodiment of a portable toilet structured according to certain principles of the invention is indicated generally at 100 and 100' in FIGS. 1 and 2, respectively. Storage device 100' includes a re-sealable container, generally 102, a leg member, generally 104, and a lid, generally 106. Portable toilet 100 includes most of the structure of device 100', but has exchanged lid 106 for a seat assembly 110.

An exemplary container 102 includes a pail or a bucket, such as a commercially available bucket 108, which can be of any desired size. The bucket 108 illustrated in FIG. 2 is of the type including a substantially cylindrical single-wall with an exterior surface of the single-wall being exposed to the environment and a wire handle rotatably attached to opposite sides of the bucket to facilitate carrying the bucket. It is within contemplation to use buckets that are preferably sized between about 3 gallons and about 7 gallons. However, an operable re-sealable container includes at least a bottom, a first wall circumscribing the bottom to define a volume between about 1 cubic foot and about 3 cubic feet, or so, in which to temporarily store noxious materials, and an access opening associated with a top of the first wall. Containers may be generally cylindrical, or may have any other shape that is desired. Containers are preferably at least water-resistant for a period of time, and desirably provide sufficient structural integrity to support the weight of a person. A workable container may be made from materials non-exclusively including metal, plastic, and plastic-like materials.

As illustrated in FIG. 1, a seat assembly 110 may be associated with a container's access opening 112. Typically a re-sealable fluid-tight lid 106 is removed and replaced by conventional toilet seat structure, such as assembly 110, to prepare the toilet 100 for use as a portable toilet. Seat assembly 110 includes a seat 114 and a covering lid 116. Illustrated seat 114 is structured to couple in functional relation with the container 102.

It is within contemplation that lid 116 may form a fluid-tight seal for the access opening 112. With reference to FIG. 2, the plain cover 118 is an exemplary embodiment of a re-sealable lid 106 that may be replaced by a seat assembly 110. Sometimes, a re-sealable lid 106 may be self-biased to form a fluid-tight seal for the access opening of a container. Other times, some sort of clamping structure, such as band clamp 120 (a portion of which is shown in cross-section in FIG. 2) may be employed to securely close the access opening 112. A seat 114 is typically removed and replaced by a fluid-tight lid, such as cover 118, to prepare the toilet for transport between sites of use, or for disposing of the toilet's contents.

With reference again to FIG. 2, container 102 includes a drain hole 124 passing through the bottom 128. A cooperating drain opening 130 is provided in the top 132 of leg member 104. A valve, generally 136, is anchored in association with the container 102 so as to occlude the drain hole 124, or not, as desired. A workable valve 136 includes a guillotine valve 138. It is within contemplation to alternatively employ a valve of a different sort, such as a ball valve. A seal element 140 may be included to resist escape of fluid between the container bottom 128 and an occluded opening 142 of a valve 136.

Alternative seal structure 140 is within contemplation. For example, an equivalent seal element may include a plurality of elements, such as an O-ring or sealing device disposed between the container bottom and part of a leg member, and another O-ring or sealing device disposed between the leg member and a valve body.

As seen in FIG. 1, an exemplary leg member 104 may be fashioned as a skirt 146. Skirt 146 includes wall structured to form an extension depending from a perimeter of bottom 128. As perhaps best shown in combination of FIGS. 1 and 2, the top of the wall forming illustrated exemplary skirt 146 is structured to engage substantially the entire perimeter of bottom 128. That is one exemplary way to accomplish a stable coupling between a skirt and a container. Advantageously, the skirt wall is flared such that its bottom forms a perimeter support surface, generally 148, defining a larger area than that encompassed by the container bottom 128. The latter structural arrangement enhances stability of the assembly 100.

With continued reference to FIGS. 1 and 2, leg member 104 spaces container bottom 128 apart from a support surface by a working distance indicated at D. A valve member 136 can therefore be protected or stored inside a volume defined by the skirt 146 and working distance D. Further, an aperture 150 is desirably formed in skirt 146, with the aperture being sized and arranged to permit manual operation of valve member 136. Desirably, the valve member is anchored in functional relation to a discharge hole 124 to permit receiving the valve handle 152 inside the skirt, at least when the valve 136 is in a closed configuration. As illustrated in FIG. 3, in certain cases, it is preferable for the drain hole 124 to be off-set from a centerline of the container 102. In FIG. 3, the valve sealing gate element 154 is in a closed position.

Figure 4:
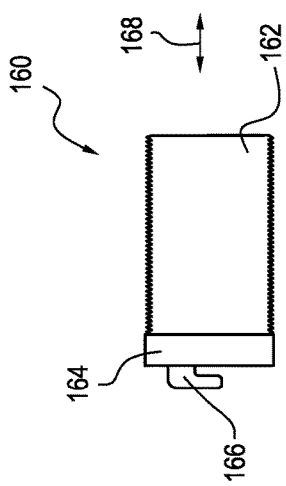
FIG. 4 is a side view of an optional adapter for use with certain embodiments of the invention.
Figure 5:
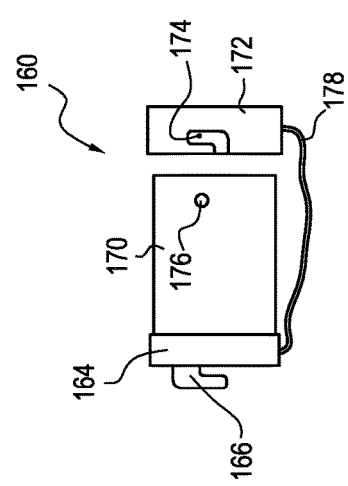
FIG. 5 is a side view of an alternative optional adapter for use with certain embodiments of the invention.

With continued reference to FIG. 3, a plurality of stiffener flanges 156 may be provided to reinforce the skirt 146. As will be discussed in more detail below, one or more flange 156 may also be shaped to securely hold a removable component and thereby provide convenient storage of the component. A removable component within contemplation includes an adapter to facilitate disposal of contents from confinement inside a container 102. FIGS. 4 and 5 illustrate a pair of such adapters 160.

Adapter 160 in FIG. 4 includes a length of flexible accordion-like hose 162 affixed on one end to a coupling 164. Coupling 164 includes a plurality of ears 166 that cooperate with pin structure (not illustrated) associated with a discharge valve and serve to connect coupling 164 in fluid-tight engagement with a valve 136. The accordion-like hose 162 can be stretched to elongate it to couple its free distal end with an opening of a receptacle for discharge of container contents, or collapsed for storage, as indicated by double-ended arrow 168. In an elongate configuration, hose 162 can form a conduit between a valve 136 and, for example, a receiving conduit of an RV dump station. In a collapsed storage configuration, hose 162 may be stored inside a skirt 146, and retained in a snap-fit arrangement by appropriately-shaped flanges 156. Alternatively, a compartment may be provided inside skirt 146 to securely hold an adapter 160.

Adapter 160 in FIG. 5 includes a length of stiff conduit 170 affixed on one end to a coupling 164. Coupling 164 includes a plurality of ears 166 that cooperate with pin structure (not illustrated) associated with a discharge valve and serve to connect coupling 164 in fluid-tight engagement with a valve 136. The conduit 170 is sized long enough to assist in guiding discharge of container contents to, for non-limiting examples, to a toilet, or a receiving conduit of an RV dump station. Conduit 170 may also be stored inside a skirt 146, and retained in a snap-fit arrangement by appropriately-shaped flanges 156. Alternatively, conduit 170 may simply be retained in association with a valve 136, and a cap 172 may be installed at the open end. One way to affix a cap 172 includes a plurality of slots 174, in which are received cooperating pins 176. Such an arrangement is similar to the coupling effected between coupler 164 and a valve 136. Sometimes, a lanyard may be provided to resist loss of a cap 172 from association with a container 102. In an alternative construction, the cap 172 may directly couple with structure associated with the valve 106 (e.g. an extension conduit 170 may not be present).

Figure 6:
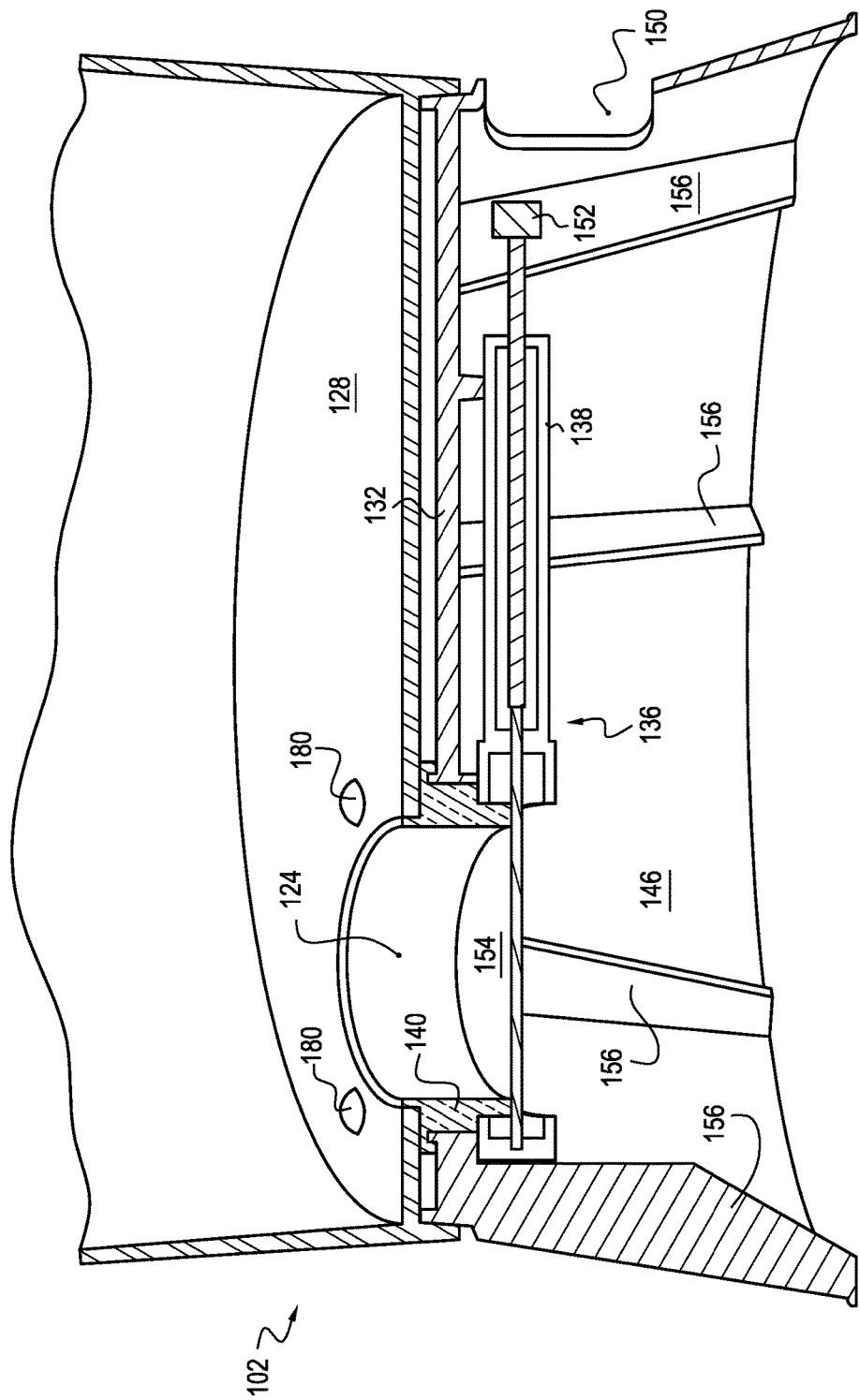
FIG. 6 is cross-section view in perspective looking at a mid-plane bottom portion of the embodiment illustrated in FIG. 1.

As illustrated in FIG. 6, structure of the top 132 may be trapped in compression between a container bottom 128 and structure associated with a valve member 136. A plurality of fasteners, such as threaded bolts 180 and cooperating nuts 182 (see FIG. 2), may be used to effect assembly. Note that handle 152 is accessible through aperture 150.

FIGS. 7 through 9 illustrate details desirable in certain fluid-tight lids 106. Exemplary lid 188 includes a coupling 190 that can connect to a hose, or other source of water or alternative cleaning fluid. Coupling 190 includes a cap 192 and a lanyard 194 to resist loss of the cap 192. Cap 192 can be secured to coupling 190 to resist escape of fluid or gas from confinement inside a container 102. That is, coupling 190 desirably includes a seal structure effective to resist egress of noxious smells or fluid from confinement inside the container. Sometimes, lid 192 may be opened slightly, for example, to vent a container 102 to equalize internal and atmospheric pressures. A spray nozzle 196 is carried on the inside of lid 188 to permit a wash-down of the inside of a container 102. Fluid applied to coupling 190 may be discharged inside a container 102, as illustrated by arrows 198 to effect a closed-system, clean-in-place wash-down of a container, and/or facilitate discharge of a container's contents.

FIG. 10 illustrates an alternative embodiment, generally indicated at 100", structured according to certain principles of the invention. Portable toilet 100" includes a container 102 made from a metal bucket 204. A seat assembly 110 is associated with the top access opening of the bucket 204. A valve 136 is disposed to occlude a discharge opening at the bottom of bucket 204. A cap 172 and lanyard 178 are also provided to redundantly close the discharge opening. A plurality of discrete feet 206 are welded to the bucket 204, and form the leg member 104.

It is within contemplation that a plurality of individual legs of a leg member 104 may be structured for assembly to a container in alternative way to form an equivalent leg member 104 to those illustrated in this disclosure. For example, it is within contemplation that a plurality of individual legs each may include a bayonet configured for reception inside a cooperating socket carried by an intermediate base or short skirt. The base or short skirt may couple to the container, and may also couple to a valve member. Alternatively, the receiving sockets may be associated with a container in some other way.

Embodiments of the invention may include one or more of the following benefits: Preferred embodiments of the device have a large capacity, e.g. holding enough solid waste for four people for a week. Embodiments of the device are cheaper compared to devices having similar capacity. Certain embodiments of the device are light and durable. Certain embodiments of the device are simple to set up, and may require little time to set up. Currently preferred embodiments are easy to transport. Certain embodiments of the device may have a small footprint.

Preferred embodiments can be emptied and rinsed without exposure to user. Embodiments encourage users to dispose of their waste appropriately. Certain embodiments of the device can dump directly into sewer system. Desirably, the device has an attached dump valve eliminating additional equipment. Currently preferred embodiments of the device allow a toilet seat to be attached. Certain embodiments of the device are stackable for pallet shipment to customers.

Certain embodiments can accommodate different lids for better sealing. One commercially available toilet seat is made by "Reliance", out of Canada. It's called "Luggable Loo Seat Cover" item #(00988003). There is a commercially available leak-proof lid called "Gamma Seal" lid. Other lids that can be used are simple snap-on lids without a seal all the way to a lid that has a gasket and a tamper proof lid. Bucket and lid manufacture "Pro-Western Plastics LTD. The metal buckets sometimes use a metal ring that expands to fit around the lid and then you snap it shut and it locks.

Embodiments of the device can be any size, to fit different size people, and can have different graphics for different situations. For non-limiting examples: hunters may want camouflage, or bright colors for natural disasters, or glow-in-the-dark or reflective paint or tape for ease in location in the dark or at night. Certain embodiments of the device can fit different shaped containers, e.g. square or round. Embodiments of the device can be formed from different materials, such as plastic or metal. Certain embodiments of the device can accept chemicals to start breaking down waste material and mask odors.

Embodiments of the device can be structured to provide approximately the same height as standard US toilets. One currently preferred skirt is approximately 4 inches tall and conventional 5-gallon buckets are around 14 inches tall. For comparison, standard toilets are between 16 and 18 inches. For small children, a 3-½ gallon bucket could be used and those buckets are 10-11 inches tall. Sometimes, embodiments of the device can be made from recycled material. While not currently preferred, a liner can also be used in embodiments of the device.

While the invention has been described in particular with reference to certain illustrated embodiments, such is not intended to limit the scope of the invention. The present invention may be embodied in other specific forms without departing from its spirit or essential characteristics. The described embodiments are to be considered as illustrative and not restrictive. The scope of the invention is, therefore, indicated by the appended claims rather than by the foregoing description. All changes which come within the meaning and range of equivalency of the claims are to be embraced within their scope.

What is claimed is:

1. A portable toilet, comprising:
   a resealable bucket with a bottom, a first wall circumscribing said bottom to partially define a fluid-tight volume between about 1 cubic foot and about 3 cubic feet in which to temporarily store noxious materials, and an access opening associated with a top of said first wall;
   seat structure operable to support a human at a seated position spaced apart from said bottom;
   a leg member operable to space said bottom above a support surface by a first distance;
   a drain hole passing through said bottom;
   a valve member operable to open and close said drain hole, as desired, actuation structure of said valve member being disposed below said bottom and in a volume partially defined by said first distance; and
   a lid structured to form a removable fluid-tight seal for said access opening.
2. The portable toilet according to claim 1, wherein:
   said seat structure comprises a toilet seat structured to couple in functional relation with said access opening.
3. The portable toilet according to claim 1, wherein:
   said lid carries a spray nozzle with a fluid discharge opening disposed to introduce fluid to the inside of said container effective to flush debris therefrom, further comprising:
   a fluid path extending in penetration through the removable lid between the spray nozzle and an externally-disposed fluid connector structured to removably couple with a fluid source; and
   removable seal structure for the fluid connector effective to resist egress of noxious smells or fluid from confinement inside the bucket.
4. The portable toilet according to claim 1, wherein:
   said valve member is a guillotine valve.
5. The portable toilet according to claim 1, further comprising:
   a removable discharge adapter structured as an enclosed conduit extension effective to convey debris from said drain hole toward a disposal receptacle.
6. The portable toilet according to claim 5, wherein:
   said adapter is a flexible hose.
7. The portable toilet according to claim 5, wherein:
   said adapter is a rigid extension.
8. The portable toilet according to claim 1, wherein:
   said leg member comprises a skirt.
9. The portable toilet according to claim 8, wherein:
   said skirt comprises a second wall structured to form an extension depending from a perimeter of said bottom.
10. The portable toilet according to claim 9, wherein:
    a top of said second wall is structured to engage substantially the entire perimeter of said bottom.
11. The portable toilet according to claim 10, wherein:
    said second wall is flared such that a bottom of said second wall forms a perimeter support surface defining a larger area than encompassed by said bottom.
12. The portable toilet according to claim 8, further comprising:
    an aperture formed in said skirt, said aperture being sized and arranged to permit manual operation of said valve member.
13. The portable toilet according to claim 1, wherein:
    said leg member is structured to provide storage for a removable discharge adapter, said adapter being structured to form an enclosed conduit extension between said valve member and a receptacle for disposal of contents of said container.
14. The portable toilet according to claim 2, wherein:
    said leg member comprises a skirt with a top formed in agreement with said bottom, a flaring second wall depending from a perimeter of said top to form a perimeter support surface defining a larger area than encompassed by said bottom, structure of said top being trapped in compression between said bottom and structure associated with said valve member, and an aperture disposed in said second wall being sized and arranged to permit manual operation of said valve member.
15. A portable toilet, comprising:
    a bucket of the type including a substantially cylindrical single-wall with an exterior surface of the single-wall being exposed to the environment and a wire handle rotatably attached to opposite sides of the bucket to facilitate carrying the bucket;
    a leg member affixed to the bucket, the leg member being structured to support the bottom of the bucket such that the bottom of the bucket is spaced apart from a support surface by a working distance;
    a drain hole passing through the bottom of the bucket;
    a valve affixed to the bucket and operable to occlude the drain hole, actuation structure of the valve being disposed below the bottom of the bucket and in a volume partially defined by the working distance;
    a removable lid structured to form a fluid-tight seal for the top of the bucket; and
    a toilet seat structured to couple with the top of the bucket.
16. The portable toilet according to claim 15, wherein:
    the leg member comprises a skirt with a skirt top formed in agreement with the bottom of the bucket, a flaring skirt wall depending from a perimeter of the skirt top to form a perimeter support surface defining a larger area than encompassed by the bottom of the bucket, structure of the skirt top being trapped in compression between the bottom of the bucket and structure associated with the valve, and an aperture disposed in the skirt wall being sized and arranged to permit manual operation of the valve.
17. The portable toilet according to claim 15, wherein:
    the removable lid carries a spray nozzle with a fluid discharge opening disposed to introduce fluid to the inside of the bucket effective to flush debris therefrom, further comprising:

a fluid path extending in penetration through the removable lid between the spray nozzle and an externally-disposed fluid connector structured to removably couple with a fluid source; and removable seal structure for the fluid connector effective to resist egress of noxious smells or fluid from confinement inside the bucket.

18. The portable toilet according to claim 15, wherein:
the drain hole is off-set from the bucket centerline.

19. The portable toilet according to claim 15, wherein:
the valve is a guillotine valve.

20. A portable toilet, comprising:

a bucket of the type including a substantially cylindrical single-wall with an exterior surface of the single-wall being exposed to the environment and a wire handle rotatably attached to opposite sides of the bucket to facilitate carrying the bucket;

a leg member affixed to the bucket, the leg member being structured to support the bottom of the bucket such that the bottom of the bucket is spaced apart from a support surface by a working distance, the working distance being between about 3 inches and about 12 inches;

a drain hole passing through the bottom of the bucket, the drain hole being off-set from a bucket centerline;

a guillotine valve affixed to the bucket and operable to occlude the drain hole, actuation structure of the valve at a closed position being disposed below the bottom of the bucket and in a working volume partially defined by the working distance, actuation structure of the guillotine valve being accessible by way of an access opening provided by the cooperatingly structured leg member;

a removable lid structured to form a fluid-tight seal for the top of the bucket; and a toilet seat structured to couple with the top of the bucket.

* * * * *